United States Patent
Naganuma et al.

(10) Patent No.: US 10,483,572 B2
(45) Date of Patent: Nov. 19, 2019

(54) FLOW CONTROL METHOD OF COOLING MEDIUM IN A FUEL CELL SYSTEM, AND FUEL CELL SYSTEM

(71) Applicant: TOYOTA JIDOSHA KABUSHIKI KAISHA, Toyota-shi, Aichi-ken (JP)

(72) Inventors: Yoshiaki Naganuma, Toyota (JP); Masashi Toida, Nagoya (JP); Tomohiro Ogawa, Toyota (JP); Tsuyoshi Maruo, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 733 days.

(21) Appl. No.: 14/922,421

(22) Filed: Oct. 26, 2015

(65) Prior Publication Data

US 2016/0133971 A1    May 12, 2016

(30) Foreign Application Priority Data

Nov. 10, 2014  (JP) .................................. 2014-227848

(51) Int. Cl.
    *H01M 8/04*       (2016.01)
    *H01M 8/04746*    (2016.01)
    (Continued)

(52) U.S. Cl.
    CPC ... *H01M 8/04768* (2013.01); *H01M 8/04029* (2013.01); *H01M 8/0432* (2013.01);
    (Continued)

(58) Field of Classification Search
    CPC ......... H01M 8/04768; H01M 8/04029; H01M 8/04225; H01M 8/0432; H01M 8/04253;
    (Continued)

(56) References Cited

U.S. PATENT DOCUMENTS

| | | | | |
|---|---|---|---|---|
| 7,749,632 B2* | 7/2010 | Zhang | ............... | H01M 8/04029 429/438 |
| 2006/0263651 A1* | 11/2006 | Fagley | .............. | H01M 8/04007 429/413 |
| 2006/0263652 A1* | 11/2006 | Logan | ............... | H01M 8/04029 429/413 |
| 2009/0035613 A1* | 2/2009 | Chikugo | ........... | H01M 8/04007 429/430 |
| 2009/0136804 A1* | 5/2009 | Bono | ................ | H01M 8/04029 429/423 |

(Continued)

FOREIGN PATENT DOCUMENTS

CN        101421879 A     4/2009
DE   11 2007 000 689 T5   2/2009

(Continued)

OTHER PUBLICATIONS

English translation of JP2012-113848 (Year: 2012).*

*Primary Examiner* — Michael L Dignan
(74) *Attorney, Agent, or Firm* — Finnegan, Henderson, Farabow, Garrett & Dunner, LLP (57) ABSTRACT

The method comprises: determining whether or not an inlet temperature is equal to or above a lower-limit temperature of a temperature range in which generated water does not freeze within the fuel cell; and adjusting the flow rate of the cooling medium in the circulation flow path to become more than the normal flow rate when it is determined that the inlet temperature is equal to or above the lower-limit temperature, and adjusting the flow rate of the cooling medium in the circulation flow path to be equal to or below the normal flow rate when it is determined that the inlet temperature is not equal to or above the lower-limit temperature.

4 Claims, 4 Drawing Sheets

(51) Int. Cl.
  *H01M 8/0432* (2016.01)
  *H01M 8/04029* (2016.01)
  *H01M 8/04223* (2016.01)
  *H01M 8/04225* (2016.01)
  *H01M 8/1018* (2016.01)

(52) U.S. Cl.
  CPC ... *H01M 8/04225* (2016.02); *H01M 8/04253* (2013.01); *H01M 8/04358* (2013.01); *H01M 2008/1095* (2013.01); *H01M 2250/20* (2013.01); *Y02T 90/32* (2013.01)

(58) Field of Classification Search
  CPC ..... H01M 8/04358; H01M 2008/1095; H01M 2250/20; H01M 8/04723; H01M 8/04268; B60L 11/1888
  See application file for complete search history.

(56) References Cited

U.S. PATENT DOCUMENTS

| | | | |
|---|---|---|---|
| 2010/0167148 A1* | 7/2010 | Manabe | H01M 8/04029 429/434 |
| 2012/0003557 A1* | 1/2012 | Tanaka | B60L 11/1885 429/429 |
| 2014/0093796 A1* | 4/2014 | Aoki | H01M 8/04723 429/413 |
| 2014/0170515 A1* | 6/2014 | Na | H01M 8/04358 429/434 |
| 2015/0120111 A1* | 4/2015 | Kim | B60L 11/1885 701/22 |

FOREIGN PATENT DOCUMENTS

| | | | | |
|---|---|---|---|---|
| DE | 11 2010 000 819 T5 | 5/2012 | | |
| JP | 2007-280827 A | 10/2007 | | |
| JP | 2010-186599 | 8/2010 | | |
| JP | 2012-113848 | * | 6/2012 | ............. H01M 8/04 |
| JP | 2012-113848 A | 6/2012 | | |

* cited by examiner

FLOW CONTROL METHOD OF COOLING MEDIUM IN A FUEL CELL SYSTEM, AND FUEL CELL SYSTEM

CROSS-REFERENCE TO RELATED APPLICATIONS

The present application claims the priority based on the Japanese Patent Application Publication No. 2014-227848 filed on Nov. 10, 2014, the entirety of disclosure of which is hereby incorporated by reference into this application.

BACKGROUND

Field

The present invention relates to flow control of a cooling medium in a fuel cell system.

Related Art

Conventionally, a technology is proposed by which in a fuel cell system having a cell stack composed of a plurality of stacked unit cells, when the system is started below the ice point, warming up is performed in a state when a cooling water pump is stopped so that the cooling water is not circulated, and the power generation site is heated up rapidly (JP2010-186599A).

However, according to the above-described technology, for a unit cell that is difficult to warm up as compared to other unit cells, such as a unit cell positioned at an end of the cell stack, it is not possible to apply the waste heat via the cooling water from another unit cell. Therefore, distribution of temperature occurs in the cell stack, and a long time is required to warm up the entire cell stack up to a predetermined temperature, which is a problem. Moreover, even within each unit cell, it is not possible to direct the waste heat of the inlet side of an oxidizing gas, which is relatively easy to warm up, toward the outlet side of the oxidizing gas via the cooling water. Therefore, distribution of temperature occurs within each unit cell, and a long time is required to warm up the entire cell stack up to a predetermined temperature, which is a problem. These problems are not restricted to the cooling water, but are a common problem in a fuel cell system in which a cooling medium of any arbitrary type, such as an antifreeze liquid or air, etc., is circulated to adjust the temperature of the cell stack.

SUMMARY

The present invention has been realized to resolve at least some of the above-described problems, and may be implemented in the aspects described below.

(1) According to one aspect of the invention, there is provided a method of controlling a cooling medium in a fuel cell system having a fuel cell, an internal flow path of the cooling medium formed inside the fuel cell, and an external flow path formed outside the fuel cell, which forms a circulating flow path of the cooling medium by being connected to the internal flow path. The method includes determining whether or not an inlet temperature, which is the temperature of the cooling medium at an inlet to the internal flow path within the circulation flow path, is equal to or higher than a lower-limit temperature of a temperature range in which generated water does not freeze within the fuel cell; and adjusting the flow rate of the cooling medium in the circulating flow path, such that when it is determined that the inlet temperature is equal to or above the lower-limit temperature, the flow rate of the cooling medium in the circulation flow path is adjusted so as to become more than a normal flow rate if the calorific value of the fuel cell is the same, and when it is determined that the inlet temperature is not equal to or above the lower-limit temperature, the flow rate of the cooling medium in the circulating flow path is adjusted below the normal flow rate, wherein the normal flow rate is a flow rate of the cooling medium during a normal operation of the fuel cell. According to the method of this aspect, when the inlet temperature is equal to or above the lower-limit temperature of the temperature range in which generated water does not freeze within the fuel cell, the flow rate of the cooling medium in the circulation flow path is adjusted to become more than the normal flow rate, because of which the conduction of heat within the fuel cell is promoted such that the occurrence of the distribution of temperature within the fuel cell can be suppressed. Therefore, the warm up time of the entire fuel cell can be shortened, and the time required for the warm-up operation of the fuel cell system can also be reduced. Moreover, in the fuel cell system of this aspect, the flow rate of the cooling medium is adjusted to become more than the normal flow rate in accordance with the judgment result of whether or not the inlet temperature is equal to or above the lower-limit temperature, and the temperature used for the judgment is the inlet temperature. Here, since the inlet temperature is the lowest temperature in the circulation flow path, if this temperature is above the lower-limit value of the temperature range in which generated water does not re-freeze, then the temperature of the cooling medium is above the lower-limit value at any position in the circulation flow path. Therefore, as a result of adjusting the flow rate of the cooling medium so that it becomes more than the normal flow, the occurrence of re-freezing of generated water in the fuel cell can be suppressed effectively as compared to the case when the temperature at any other site is used in the judgment process.

(2) In the method of controlling the cooling medium in the fuel cell of the above aspect, the adjusting the flow rate of the cooling medium in the circulation flow path may include adjusting the flow rate of the cooling medium in the circulation flow path to become less than the normal flow rate when it is determined that the inlet temperature is not equal to or above the lower-limit temperature. According to the method of this aspect, when the inlet temperature is not equal to or above the lower-limit temperature of the temperature range in which generated water does not freeze within the fuel cell, the flow rate of the cooling medium in the circulation flow path is adjusted so as to become less than the normal flow rate, because of which, re-freezing of generated water in the fuel cell can be prevented, and the heat generation site in the fuel cell is cooled by the cooling medium, and thus, a drop in the calorific value of the site can be suppressed.

(3) The method of controlling the cooling medium in the fuel cell of the above aspect may further include acquiring a temperature of the fuel cell, and adjusting the flow rate of the cooling medium in the circulation flow path to the normal flow rate, wherein determining whether or not the inlet temperature is equal to or above the lower-limit temperature, as well as adjusting the flow rate of the cooling medium in the circulation flow path so as to become more than the normal flow rate when it is determined that the inlet temperature is equal to or above the lower-limit temperature, and adjusting the flow rate of the cooling medium in the circulation flow path so as to become equal to or below the normal flow rate when it is determined that the inlet temperature is not equal to or above the lower-limit temperature are executed when the temperature of the fuel cell during a time period when the temperature of the fuel cell system is lower than an end temperature that is predetermined as a temperature at the time of end of a warm-up operation, and are terminated when the temperature of the fuel cell system becomes equal to or more than the end temperature, the time period is included in a time period when the warm-up operation is executed on start of the fuel cell system at a below-zero degrees Celsius temperature, and the adjusting the flow rate of the cooling medium in the circulation flow path to the normal flow rate is executed when the temperature of the fuel cell becomes equal to or more than the end temperature. According to the method of this aspect, during the time period when the warm-up operation is being executed, re-freezing of generated water in the fuel cell can be suppressed, and the occurrence of distribution of temperature within the fuel cell can be suppressed, because of which the time required for the warm-up operation can be shortened.

(4) In the method of controlling the cooling medium in the fuel cell of the above aspect, determining whether or not the inlet temperature is above the lower-limit temperature may include: acquiring the outlet temperature that is the temperature of the cooling medium at the outlet of the internal flow path within the circulation flow path; determining whether or not the outlet temperature is equal to or above the lower-limit temperature; determining whether or not the cooling medium having a predetermined volume corresponding to a volume of at least an external flow path of the circulation flow path passes through the inlet during the time period that has elapsed since the previous judgment until the current judgment of the fact that the outlet temperature is equal to or above the lower-limit temperature, when it is determined that the outlet temperature is equal to or above the lower-limit temperature; and determining that the inlet temperature is equal to or above the lower-limit temperature when it is determined that the cooling medium having the predetermined volume passes through the inlet during the elapsed time, and determining that the inlet temperature is not equal to or above the lower-limit temperature when it is determined that the outlet temperature is not equal to or above the lower-limit temperature, or the cooling medium having the predetermined volume does not pass through the inlet during the elapsed time. According to the method of this aspect, since it is not determined that the inlet temperature is equal to or above the lower-limit temperature until the cooling medium having the predetermined volume corresponding to the volume of the external flow path passes through the inlet during the elapsed time period, when it is determined that the outlet temperature is equal to or above the lower-limit temperature, the judgment of whether or not the inlet temperature is equal to or above the lower-limit value can be performed accurately.

The present invention can be implemented in various aspects. For example, the present invention can be implemented in aspects such as a fuel cell system, a vehicle on which a fuel cell system is mounted, a method of controlling a fuel cell system when it is started below the ice point, a program for implementing a method of controlling the flow of cooling water in a fuel cell system or a method of controlling the fuel cell system when it is started below the ice point, and a recording medium for recording such a program.

DESCRIPTION OF EMBODIMENTS

Figure 1:
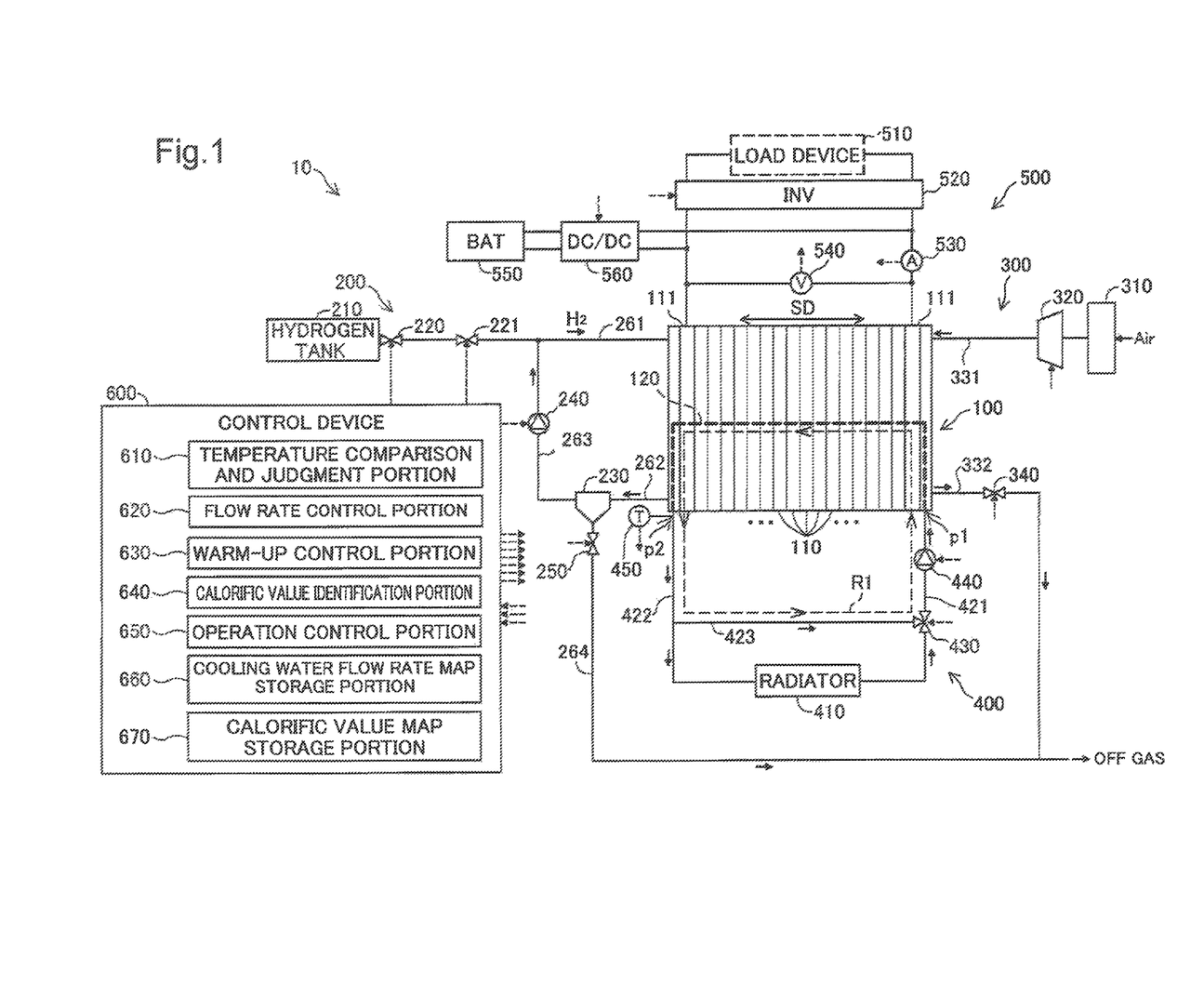
FIG. 1 is a block diagram showing a schematic configuration of a fuel cell system as a first embodiment of the present invention.

A. Embodiment:
A1. System Configuration:
FIG. 1 is a block diagram showing a schematic configuration of a fuel cell system as a first embodiment of the present invention. The fuel cell system 10 of the present embodiment is used as a system for supplying the drive power mounted on a fuel cell vehicle. The fuel cell system 10 includes a fuel cell 100, a fuel gas supply and discharge mechanism 200 that is also called a fuel gas supply and discharge system, an oxidizing gas supply and discharge mechanism 300 that is also called an oxidizing gas supply and discharge system, a fuel cell circulation and cooling mechanism 400 that is also called a fuel cell circulation and cooling system, a power charging and discharging mechanism 500 that is also called the power charging and discharging system, and a control device 600.

The fuel cell 100 is a so-called polymer electrolyte fuel cell, which includes a cell stack composed of a plurality of unit cells 110 stacked along a stacking direction SD, and a pair of current collecting plates 111 that function as integrated electrodes arranged at the outer side of both ends of the cell stack. Each unit cell 110 includes a solid polymer electrolyte membrane, an anode-side catalyst electrode layer and a cathode-side catalyst electrode layer. The anode-side catalyst electrode layer and the cathode-side catalyst electrode layer sandwich the solid polymer electrolyte membrane. Each unit cell 110 generates power through an electrochemical reaction between hydrogen, which is a fuel gas supplied to an anode-side catalyst electrode layer, and oxygen included in the air, which is an oxidizing gas supplied to a cathode-side catalyst electrode layer. The catalyst electrode layer is configured by a catalyst, such as carbon particles carrying platinum (Pt), and an electrolyte. In the unit cell 110, a gas diffusion layer formed by a porous body is arranged at the outer side of the catalyst electrode layer at both electrode sides. A carbon porous body, such as a carbon paper and carbon cloth, etc., or a metallic porous body, such as a metal mesh or foam metal, etc. can be used as the porous body, for example. Manifolds for allowing distribution of the fuel gas, oxidizing gas, and cooling water is formed inside the fuel cell 100. FIG. 1 illustrates a cooling water distribution manifold 120 through dashed lines. In the present embodiment, the cooling water distribution manifold 120 has a structure in which a cooling water supply manifold and a cooling water discharge manifold (not shown in the figure), which are formed along the stacking direction SD, are connected via a cooling water flow path inside each unit cell 110. It must be noted that the above-described cooling water supply manifold is connected to a cooling water supply path 421, described later, which is included in the fuel cell circulation and cooling mechanism 400. Moreover, the above-described cooling water discharge manifold is connected to a cooling water discharge path 422, described later, which is included in the fuel cell circulation and cooling mechanism 400.

The fuel gas supply and discharge mechanism 200 performs supply of the fuel gas to the fuel cell 100 and discharge of the anode-side off gas from the fuel cell 100. The fuel gas supply and discharge mechanism 200 includes a hydrogen tank 210, a cut-off valve 220, an injector 221, a gas-liquid separator 230, a circulation pump 240, a purge valve 250, a fuel gas supply path 261, a first fuel gas discharge path 262, a fuel gas circulation path 263, and a second fuel gas discharge path 264.

The hydrogen tank 210 stores high-pressure hydrogen, and supplies hydrogen gas as fuel gas to the fuel cell 100 via the fuel gas supply path 261. The cut-off valve 220 is arranged near a supply port of the fuel gas in the hydrogen tank 210, and switches between supplying and stopping the supply of hydrogen gas from the hydrogen tank 210. The injector 221 is arranged in the fuel gas supply path 261, and adjusts the supply amount and pressure of hydrogen gas to the fuel cell 100. The gas-liquid separator 230 is arranged in the first fuel gas discharge path 262, and separates the water included in the anode-side off gas discharged from the fuel cell 100 and discharges it to the second fuel gas discharge path 264, and discharges the gas after separation of water, that is, the fuel gas, to the fuel gas circulation path 263. The circulation pump 240 is arranged in the fuel gas circulation path 263, and supplies the fuel gas discharged from the gas-liquid separator 230 to the fuel gas supply path 261. The purge valve 250 is arranged in the second fuel gas discharge path 264, and when opened, allows the discharge of the water and off gas separated by the gas-liquid separator 230 to the atmosphere.

The oxidizing gas supply and discharge mechanism 300 performs supply of the oxidizing gas to the fuel cell 100 and discharge of the cathode-side off gas from the fuel cell 100. The oxidizing gas supply and discharge mechanism 300 includes an air cleaner 310, an air compressor 320, a back pressure regulating valve 340, an oxidizing gas supply path 331, and an oxidizing gas discharge path 332. The air cleaner 310 removes impurities such as dust from the air with the help of a filter provided inside, and supplies the air after removal of impurities to the air compressor 320. The air compressor 320 compresses the air supplied from the air cleaner 310 and delivers it to the oxidizing gas supply path 331. The back pressure regulating valve 340 is arranged in the oxidizing gas discharge path 332, and adjusts the so-called back pressure, which is the pressure at the cathode discharge side in the fuel cell 100. The oxidizing gas discharge path 332 is connected to the above-described second fuel gas discharge path 264, and the water and cathode-side off gas that is discharged through the oxidizing gas discharge path 332 is discharged to the atmosphere along with the water and anode-side off gas discharged through the second fuel gas discharge path 264.

The fuel cell circulation and cooling mechanism 400 adjusts the temperature of the fuel cell 100 by circulating the cooling water via the fuel cell 100. The fuel cell circulation and cooling mechanism 400 includes a radiator 410, a cooling water supply path 421, a cooling water discharge path 422, a bypass flow path 423, a three-way valve 430, a circulation pump 440, and a temperature sensor 450.

The radiator 410 is connected to the cooling water discharge path 422 and the cooling water supply path 421, and cools the cooling water flowing in from the cooling water discharge path 422 with the help of the air blast from an electrically-driven fan not shown in the figure, and discharges it to the cooling water supply path 421. One end of the cooling water supply path 421 is connected to the radiator 410, and the other end is connected to the cooling water distribution manifold 120 in the fuel cell 100. One end of the cooling water discharge path 422 is connected to the cooling water distribution manifold 120 in the fuel cell 100, and the other end is connected to the radiator 410. One end of the bypass flow path 423 is connected to the cooling water discharge path 422, and the other end is connected to the cooling water supply path 421. By distributing the cooling water from the cooling water discharge path 422 to the cooling water supply path 421 by by-passing the radiator 410, the cooling water can be circulated without being cooled by the radiator 410. In the present embodiment, nonfreezing water, such as ethylene glycol is used as the cooling water. However, rather than using only nonfreezing water, any arbitrary medium that enables heat exchange, such as a gaseous body like air may be used as the cooling medium.

The three-way valve 430 is arranged at the connecting site of the bypass flow path 423 and the cooling water supply path 421. Through the adjustment of the valve opening of the three-way valve 430, the existence of communication between the bypass flow path 423 and the cooling water supply path 421 is controlled. Specifically, in a state when the three-way valve 430 is closed, the bypass flow path 423 and the cooling water supply path 421 do not communicate with each other. At this time, a circulation flow path is formed in the fuel cell circulation cooling mechanism 400. The circulation flow path jointly forms the cooling water distribution manifold 120 in the fuel cell 100, the cooling water discharge path 422, the radiator 410, the cooling water supply path 421, and the circulation pump 440. In contrast, in a state when the three-way valve 430 is open, the bypass flow path 423 and the cooling water supply path 421 communicate with each other. At this time, the circulation flow path R1 shown in FIG. 1 by dashed lines is formed in the fuel cell circulation cooling mechanism 400. The circulation flow path R1 jointly forms the cooling water distribution manifold 120 in the fuel cell 100, the cooling water discharge path 422, the bypass flow path 423, the cooling water supply path 421, and the circulation pump 440. Particularly, when the three-way valve 430 is fully open, the cooling water discharged from the cooling water distribution manifold 120 of the fuel cell 100 to the cooling water discharge path 422 moves toward the bypass flow path 423 rather than the radiator 410. Therefore, the cooling water circulates only in the above-described circulation flow path R1.

The circulation pump 440 is arranged between the three-way valve 430 and the fuel cell 100 in the cooling water supply path 421, and adjusts the circulation flow of the cooling medium in the fuel cell circulation cooling mechanism 400. The temperature sensor 450 is arranged close to the outlet p2 of the cooling water distribution manifold 120 in the cooling water discharge path 422, measures the temperature of the cooling water at the outlet p2 (hereinafter referred to as "the outlet temperature"), and outputs a signal showing the temperature value. In the present embodiment, the outlet temperature is treated as the temperature of the fuel cell 100.

The power charging and discharging mechanism 500 supplies the electric power output from the fuel cell 100 or the battery 550 to the load device 510. In the present embodiment, the load device 510 includes a motor for driving the vehicle, or various auxiliary devices, and is connected to the current collecting plate 111 at the positivepolarity side and the current collecting plate 111 at the negative polarity side of the fuel cell 100. The power charging and discharging mechanism 500 includes an inverter 520, an ammeter 530, a voltmeter 540, a DC-DC converter 560, and a battery 550. The inverter 520 is connected in parallel to the fuel cell 100 and the battery 550, converts the DC current supplied from the fuel cell 100 or the battery 550 to AC current, and supplies it to the load device 510. The ammeter 530 measures the current value output from the fuel cell 100, and outputs a signal indicating the current value. The voltmeter 540 measures the output voltage of the fuel cell 100, and outputs a signal indicating the voltage value. The DC-DC converter 560 boosts the output voltage of the battery 550 and supplies it to the inverter 520, and furthermore, in order to store the redundant electric power of the fuel cell 100, steps down the output voltage and supplies it to the battery 550.

The control device 600 is electrically connected to the above-described cutoff value 220, the injector 221, the circulation pump 240, the purge valve 250, the air compressor 320, the back pressure regulating valve 340, the circulation pump 440, the three-way valve 430, the inverter 520, and the DC-DC converter 560, and controls them. Moreover, the control device 600 is electrically connected to the temperature sensor 450, and receives the signal indicating the temperature value that is output from the temperature sensor 450. The control device 600 is configured by a micro-computer (not shown in the figure), which includes a Central Processing Unit (CPU), Read Only Memory (ROM), and Random Access memory (RAM), and by executing a control program stored in the ROM, the CPU functions as a temperature comparison and judgment portion 610, a flow rate control portion 620, a warm-up control portion 630, a calorific value identification portion 640, and an operation control portion 650.

In the cooling water flow control process during warm-up, which is described later, the temperature comparison and judgment portion 610 executes a process of determining whether or not the temperature of the inlet p1 of the cooling water distribution manifold 120 (hereinafter referred to as the "inlet temperature") is equal to or above a predetermined threshold temperature (hereinafter referred to as the "inlet temperature comparison and judgment process"). By adjusting the flow rate of the circulation pump 440, the flow rate control portion 620 controls the flow of the cooling medium in the fuel cell circulation and cooling mechanism 400. The warm-up control portion 630 controls the warm-up operation performed in the fuel cell system 10. In the fuel cell system 10, the warm-up operation is performed when the temperature of the fuel cell 100, that is the outlet temperature, at the time when the ignition ON is below 0 degrees Celsius. In the present embodiment, during the warm-up operation, by constricting the amount of supply of air, which is the oxidizing gas, to the fuel cell 100, as compared to the normal operation, each unit cell 110 is operated at a low power generation efficiency, and the loss in power generation (the heat loss) is increased to raise the temperature. The constriction of the amount of supply of air is performed by setting the air stoichiometric ratio to a value close to 1.0, for example. The warm-up operation is performed until the inlet temperature reaches the warm-up end temperature. In the present embodiment, the warm-up end temperature is set beforehand as the inlet temperature when the temperature at each site of the fuel cell 100 becomes more than a predetermined temperature that is higher than 0 degrees Celsius. For example, the inlet temperature that is above a predetermined temperature of 72 degrees Celsius or more and 80 degrees Celsius or less, which is the temperature at which power can be generated with high efficiency in each unit cell, is set beforehand as the warm-up end temperature. The calorific value identification portion 640 identifies the calorific value of the fuel cell 100. By controlling each of the above-described function portion 610 to 640, and also controlling the driving and stopping of each component that is electrically connected to the control device 600, such as the air compressor 320 and the injector 221, the operation control portion 650 controls the operation of the fuel cell system 10 including the power generation of the fuel cell 100.

In the ROM (not shown in the figure) of the control device 600, in addition to the above-described control program, a cooling water flow rate map storage portion 660 and a calorific value map storage portion 670 are provided. A cooling water flow rate map is already stored in the cooling water flow rate map storage portion 660. A calorific value map is already stored in the calorific value map storage portion 670.

Figure 2:
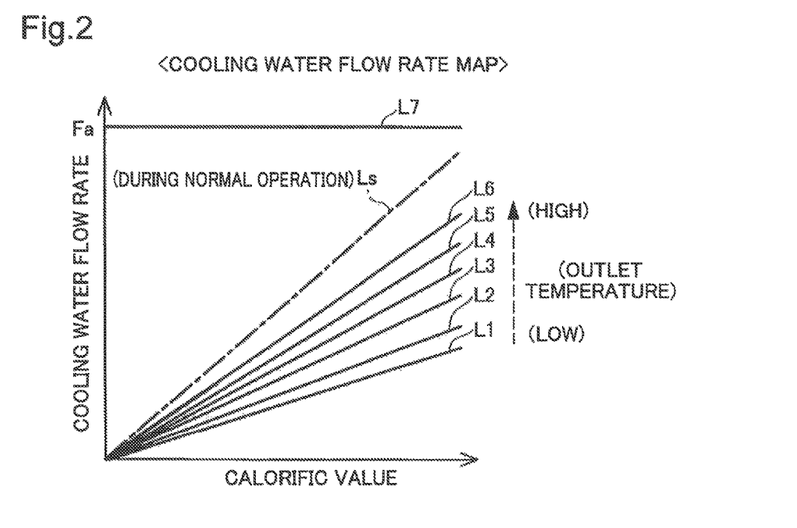
FIG. 2 is an explanatory drawing that schematically illustrates an example of the setting contents of a cooling water flow rate map according to the present embodiment.

FIG. 2 is an explanatory drawing that schematically illustrates an example of the setting contents of a cooling water flow rate map according to the present embodiment. In FIG. 2, the horizontal axis shows the calorific value of the fuel cell 100, and the vertical axis shows the cooling water flow rate (the volume of the cooling water that flows in unit time). In the cooling water flow rate map, the calorific value of the fuel cell 100 and the cooling water flow rate are correlated. The dash-dot line Ls in FIG. 2 shows the correspondence between the calorific value used during normal operation and the cooling water flow rate. During normal operation, the flow rate control portion 620 determines the cooling water flow on the basis of the calorific value of the fuel cell 100 with reference to the line Ls, and controls the circulation pump 440 so that the determined flow rate is reached. The above-described "normal operation" indicates the state of operating the fuel cell 100 by assuming the stoichiometric ratio of oxygen as 1.3 to 1.8. Moreover, as described in the present embodiment, in a configuration in which the fuel cell system 10 is used in a fuel cell vehicle, normal operation indicates the operating state of the fuel cell 100 when the vehicle is running in a steady state. In other words, normal operation does not include the operating state of the fuel cell 100 when intermittent operation or transient operation is being performed.

The seven lines L1, L2, L3, L4, L5, L6, and L7 shown by a solid line in FIG. 2 show the correspondence between the calorific value and the cooling water flow rate when the cooling water flow control process during warm-up, which is described later, is performed during startup below the ice point. These seven lines L1 to L7 are set depending on the temperature of the fuel cell 100, that is, the outlet temperature. Specifically, line L1 is set as the correspondence between the calorific value and the cooling water flow rate that is used when the temperature of the fuel cell 100 is the lowest, and thereafter, lines L2, L3, L4, L5, L6, and L7 are set as the correspondence used when the temperature of the fuel cell 100 is relatively higher in that order. Line L7 is used when the temperature of the fuel cell 100 is equal to or above the lower-limit temperature of the temperature range in which the generated water that occurs in each unit cell 110 does not freeze. Specifically, in the present embodiment, line L7 is used when the temperature of the fuel cell 100 is 0 degrees Celsius or higher. In contrast, the remaining lines L1 to L6 are used when the temperature of the fuel cell 100 is lower than 0 degrees Celsius. During startup below the ice point, the flow rate control portion 620 determines the cooling water flow rate on the basis of the calorific value of the fuel cell 100 with reference to the seven lines L1 to L7, and controls the circulation pump 440 so that the determined flow rate is reached.

For the six lines L1 to L6 from among the seven lines L1 to L7, the cooling water flow rate is also set to increase in accordance with the increase in the calorific value. This is to promote the exchange of heat between each unit cell 110 by increasing the cooling water flow rate in accordance with the increase in the calorific value, so as to reduce the distribution of heat between each unit cell 110. Moreover, when these six lines L1 to L6 have the same calorific value, the higher the temperature of the fuel cell 100, the higher the cooling water flow is set to become. In other words, if the calorific value is the same, the cooling water flow is set to become less as the temperature of the fuel cell 100 drops. The reason for this setting is explained below. When the temperature of the fuel cell 100 is lower than the lower-limit temperature of the temperature range in which the generated water does not freeze, if the cooling water flow is large, each unit cell 110 is cooled by the cooling water, and re-freezing of generated water may occur. In addition, if the cooling water flow is large when the calorific value is less, the calorific value drops since the heat generation site is cooled, and thus, warm-up is suppressed. Thus, if the calorific value is the same for the six lines L1 to L6, the cooling water flow is set to decline as the temperature of the fuel cell 100 drops, and thus, along with the control of re-freezing of generated water, the drop in the calorific value is also suppressed. Moreover, if each of the six lines L1 to L6 has the same calorific value, a cooling water flow rate that is lower than line Ls during normal operation is set. The reason for this setting is also the same as the reason for setting the cooling water flow to become less as the temperature of the fuel cell 100 drops when the calorific value is the same, as described above. In other words, when the temperature of the fuel cell 100 is less than the lower-limit temperature of the temperature range in which generated water does not freeze, the cooling water flow is controlled below the value during normal operation so as to control re-freezing of generated water through circulation of the cooling water.

In contrast, in line L7, no matter what the calorific value, a large cooling water flow rate is set as compared to the line Ls during normal operation. When the temperature of the fuel cell 100 is equal to or above 0 degrees Celsius, re-freezing of generated water does not occur in each unit cell 110 even if the cooling water is circulated. Therefore, in such a case, by circulating as much cooling water as possible, heat is transferred to each unit cell 110 in a short period of time, and the occurrence of distribution of heat between the unit cells 110 is suppressed, thus enabling a reduction in the warm-up time of the fuel cell 100. Therefore, in the present embodiment, in line L7, the upper-limit flow Fa, which is the flow that can be supplied by the circulation pump 440 and which satisfies the conditions of vibrations and noise accompanying the pump driving, is set as the cooling water flow regardless of the calorific value.

Figure 3:
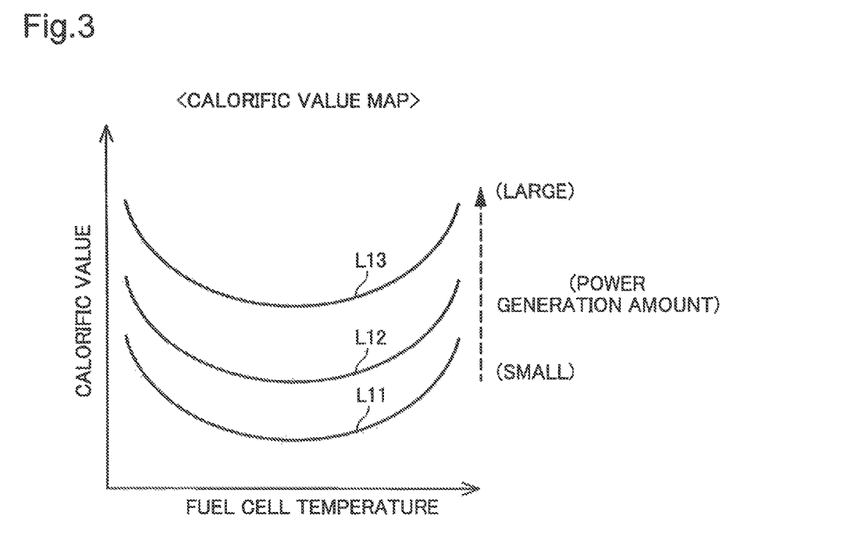
FIG. 3 is an explanatory drawing that schematically illustrates an example of the setting contents of a calorific value map according to the present embodiment.

FIG. 3 is an explanatory drawing that schematically illustrates an example of the setting contents of a calorific value map according to the present embodiment. In FIG. 3, the horizontal axis shows the temperature of the fuel cell 100, and the vertical axis shows the calorific value. In the calorific value map, the temperature of the fuel cell 100 and the calorific value of the fuel cell 100 are correlated. Each of the three curved lines L11, L12, and L13 in FIG. 3 show the correspondence between the temperature of the fuel cell 100 and the calorific value of the fuel cell 100. In the present embodiment, the temperature of the fuel cell 100 and the calorific value of the fuel cell 100 are set depending on the amount of power generated by the fuel cell 100. Specifically, line L11 is set as the correspondence between the temperature of the fuel cell 100 and the calorific value of the fuel cell 100 that is used when the amount of power generated is the lowest, and thereafter, lines L12 and L13 are set as the correspondence used when the amount of power generated is relatively higher in that order.

When the temperature of the fuel cell 100 is the same, the calorific value increases as the amount of power generated increases. Therefore, when the temperature of the fuel cell 100 is the same, the calorific value of the fuel cell is large in the order of lines L13, L12, and L11. As shown in each line L11 to L13, in a relatively low temperature range, the change in the calorific value with respect to the change in the temperature becomes large. Specifically, in a low-temperature range, the calorific value increases rapidly with a slight decline in temperature. This is because if the temperature of the fuel cell 100 declines in the low-temperature range, the activation of the catalyst in each unit cell 110 is hindered, and in addition, the effective amount of catalyst that can function as the catalyst, in other words, the effective heat generation area reduces due to flooding, because of which the heat generation efficiency declines, and heat is generated. Similarly, in a relatively high temperature range, the calorific value increases rapidly with a slight increase in temperature. This is because if the temperature of the fuel cell 100 increases in the high-temperature range, the solid polymer electrolyte membrane in each unit cell 110 dries out causing the resistance value of the membrane to increase, thus resulting in generation of heat. Such a heat generation amount map can be set by determining the relationship between the temperature and calorific value of the fuel cell 100 in advance through an experiment.

In the fuel cell system 10 having the above-described configuration, due to the execution of the cooling water flow control process during warm-up, which is described later, at the time of execution of the warm-up operation, the warm-up operation time can be reduced. The above-described cooling water distribution manifold 120 corresponds to the internal flow path in the claims. Moreover, the circulation flow path R1 corresponds to the circulation flow path in the claims, and the cooling water discharge path 422, the bypass flow path 423, the cooling water supply path 421, and the circulation pump 440 correspond to the external flow path in the claims.

Figure 4:
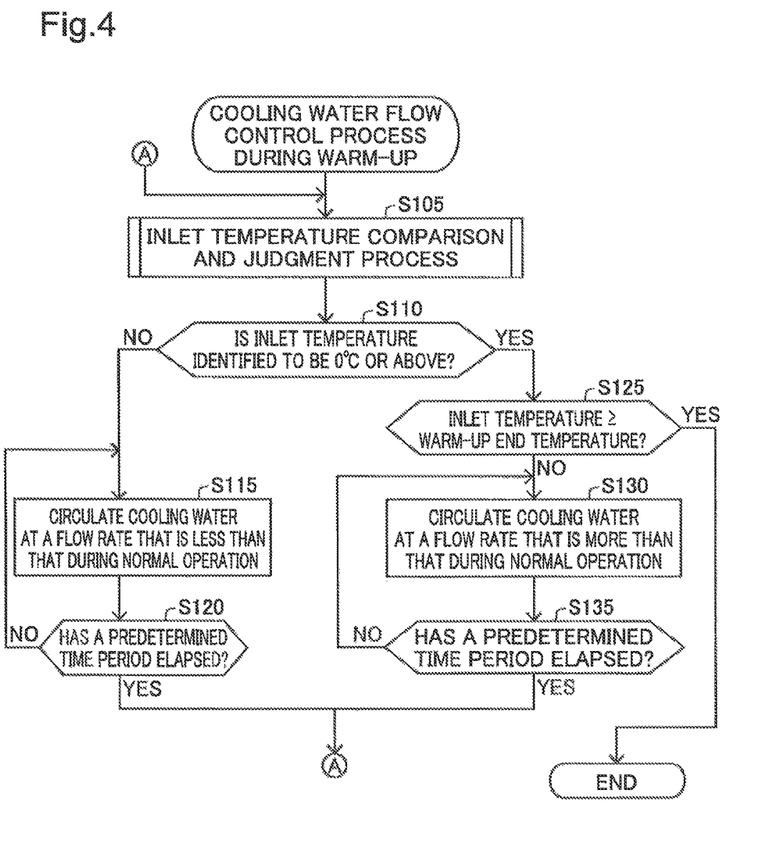
FIG. 4 is a flowchart showing a procedure of a cooling water flow control process during warm-up according to the present embodiment.

A2. Cooling Water Flow Control Process During Warm-up:

FIG. 4 is a flowchart showing a procedure of a cooling water flow control process during warm-up according to the present embodiment. In the fuel cell system 10, when the above-described warm-up operation is started, the cooling water flow control process during warm-up is also started. At the time of the start of the warm-up operation, the three-way valve 430 is fully open, and the circulation flow path R1 is formed. Therefore, the entire cooling water discharged from the cooling water distribution manifold 120 is led to the bypass flow path 423. Moreover, at the time of start of the cooling water flow control process during warm-up, the circulation pump 440 is not driven, and therefore, the circulation amount of the cooling water in the circulation flow path R1 is zero. The above-described "circulation amount of the cooling water in the circulation flow path R1" indicates the amount of cooling water flowing through the circulation flow path R1, and in the present embodiment, implies the amount (volume) of cooling water passing through any arbitrary position (for example, the inlet p1) in the circulation flow path R1. In the cooling water flow control process during warm-up, first of all, the temperature comparison judgment portion 610 executes the inlet temperature comparison and judgment process (step S105).

Figure 5:
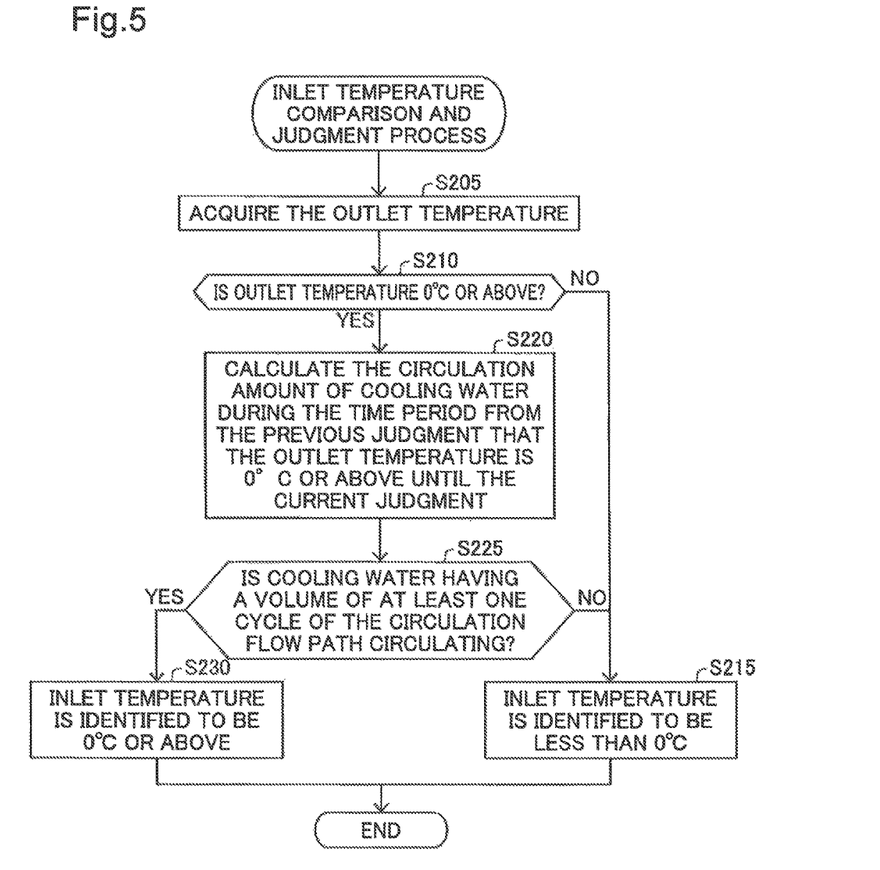
FIG. 5 is a flowchart showing a procedure of an inlet temperature comparison judgment process according to the present embodiment.

FIG. 5 is a flowchart showing a procedure of an inlet temperature comparison and judgment process according to the present embodiment. The temperature comparison and judgment portion 610 acquires the outlet temperature (step S205), and determines whether the outlet temperature is 0 degrees Celsius or above (step S210). If it is determined that the outlet temperature is not 0 degrees Celsius or above (step S210: NO), the temperature comparison and judgment portion 610 identifies that the temperature of the inlet p1 is below 0 degrees Celsius (step S215). No heat generating site exists in the flow path passing through the cooling water discharge path 422, the bypass flow path 423, the cooling water supply path 421, and the circulation pump 440 (hereinafter referred to as the "external flow path"). In contrast, in the cooling water distribution manifold 120, waste heat is generated in each unit cell 110 by the warm-up operation. Therefore, in the circulation flow path R1, the temperature of the cooling water is the highest at the outlet p2 where the cooling water that passes through each unit cell 110 in the cooling water distribution manifold 120 gets collected. As a result, when the outlet temperature is not 0 degrees Celsius or above, that is, the outlet temperature is below 0 degrees Celsius, it is identified in step S215 above that "the temperature at the inlet p1 is below 0 degrees Celsius".

In the above-described step S210, if it is determined that the outlet temperature is 0 degrees Celsius or above (step S210: YES), the temperature comparison and judgment portion 610 determines the circulation amount of cooling water during the time period from the previous judgment until the current judgment (hereinafter referred to as the "judgment period") in step S210 about the fact that the outlet temperature is 0 degrees Celsius or above (step S220). As described later, in the cooling water flow control process during warm-up according to the present embodiment, the inlet temperature comparison and judgment process is repeatedly executed until the inlet temperature becomes the warm-up end temperature. Therefore, step S210 is also executed repeatedly. In step S220, the time period from the previous judgment until the current judgment of the fact that the outlet temperature is 0 degrees Celsius or above is determined, and by multiplying this time period with the cooling water flow rate determined based on the above-described lines L1 to L7 of the cooling water flow rate map, the circulation amount of the cooling water can be determined. It must be noted that if step S220 is executed first, the circulation flow rate is determined to be "zero" since the circulation pump 440 is not driven. The above-described judgment period corresponds to the elapsed time in the claims.

Based on the circulation amount determined in step S220, the temperature comparison and judgment portion 610 determines whether or not the cooling water having a volume of at least one cycle of the circulation flow path R1 circulates around the circulation flow path R1 in the judgment period (step S225). The volume of the circulation flow path R1 is already stored in the ROM of the control device 600, and the temperature comparison and judgment portion 610 can compare this volume with the circulation amount determined in step S220 to determine if the cooling water having a volume of at least one cycle of the circulation flow path R1 circulates within the judgment period.

If it is determined that the cooling water having a volume of at least one cycle of the circulation flow path R1 does not circulate within the judgment period (step S225: NO), the above-described step S215 is executed. Therefore, in such a case, the inlet temperature is assumed to be below 0 degrees Celsius. In contrast, if it is determined that the cooling water having a volume of at least one cycle of the external circulation flow path R1 circulates within the judgment period (step S225: YES), the temperature comparison and judgment unit 610 determines that the inlet temperature is 0 degrees Celsius or above (step S230). The reason why the inlet temperature is assumed to be below 0 degrees Celsius when it is determined that cooling water having a volume of at least one cycle of an external flow path circulates within the judgment period is described below. As described above, the position where the temperature of the cooling water is the highest in the circulation flow path R1 is the outlet p2. In contrast, the position where the temperature of the cooling water is the lowest in the circulation flow path R1 is the inlet p1 that is farthest away from the outlet p2 in the external flow path having no heat generation sites. Therefore, at the point of time when it is determined that the temperature at the outlet p2 is 0 degrees Celsius or above, the temperature of the inlet p1 may be lower than 0 degrees Celsius. However, if cooling water having a volume of one cycle of the circulation flow path R1 circulates after it is determined that the temperature of the outlet p2 is 0 degrees Celsius or above, the water having a relatively high temperature that exists in the cooling water distribution manifold 120 circulates one cycle when it is determined that the temperature at the outlet p2 is 0 degrees Celsius or above, and therefore, the possibility of temperature becoming 0 degrees Celsius or above even at the inlet p1 is high. Thus, in this case, the inlet temperature is identified to be 0 degrees Celsius or above.

As shown in FIG. 4, after the completion of execution of the above-described inlet temperature comparison and judgment process, the flow rate control portion 620 determines whether or not the inlet temperature is identified to be 0 degrees Celsius or above (step S110) based on the result of the inlet temperature comparison and judgment process. If the flow rate control portion 620 does not determine that the inlet temperature is identified to be 0 degrees Celsius or above, in other words, if the flow rate control portion 620 determines that the inlet temperature is identified to be below 0 degrees Celsius (step S110: NO), the flow rate control portion 620 circulates the cooling water at a flow rate that is less than that during normal operation. "A flow rate that is less than that during normal operation" implies a flow that is less than the flow in the case when the calorific value of the fuel cell 100 is the same during normal operation. Specifically, the flow rate control portion 620 determines the calorific value of the fuel cell 100 by referencing the calorific value map on the basis of the outlet temperature acquired in step S205 described above and the amount of power generated by the fuel cell 100. The amount of power generated by the fuel cell 100 can be determined from the current value measured by the ammeter 530 and the voltage value measured by the voltmeter 540. If the calorific value of the fuel cell 100 is not the calorific value corresponding to any one of the three lines L11 to L13, the calorific value of the fuel cell 100 can be determined by the interpolation method by using the line corresponding to the closer amount of power generated. Also, the flow rate control portion 620 decides the flow rate of the cooling water by referencing the cooling water flow rate map on the basis of the determined calorific value and outlet temperature, and controls the circulation pump 440 so that the decided flow rate is reached.

If step S115 is executed, the possibility of the outlet temperature being below 0 degrees Celsius is high, and therefore, as described above, the possibility of the cooling water flow being decided on the basis of the six lines L1 to L6 shown in FIG. 2 is high. In the present embodiment, if the outlet temperature is not a temperature corresponding to any one of the six lines L1 to L6, the flow can be determined by the interpolation method by using the line corresponding to the closer temperature. The cooling water flow of each of the lines L1 to L6 is less than the cooling water flow of line Ls at the same calorific value. Therefore, by controlling the circulation pump 440 so that the flow rate determined on the basis of the six lines L1 to L6 is reached, the cooling water can be circulated at a flow rate that is less than that during normal operation. Because the cooling water is circulated at a flow rate that is less than that during normal operation, re-freezing of generated water in each unit cell 110 can be suppressed. In addition, the cooling of the heat generation sites in each unit cell 110 by the cooling water, and thus, the drop in the calorific value is suppressed. The temperature comparison and judgment portion 610 repeatedly executes step S115 from the time of start of step S115 until the predetermined time period has elapsed, and if the predetermined time period has elapsed (step S120: YES), the temperature comparison and judgment portion 610 returns to the above-described step S105.

In the above-described step S110, if it is determined that the inlet temperature is identified to be 0 degrees Celsius or above (step S110: YES), the flow rate control portion 620 determines whether or not the inlet temperature is equal to or above the warm-up end temperature (step S125). If it is determined that the inlet temperature is equal to or above the warm-up end temperature (step S125: YES), the cooling water flow control process during warm-up ends. At this time, the warm-up operation also ends and switches to the normal operation. As a result, the three-way valve 430 opens, and at least some of the cooling water discharged from the cooling water distribution manifold 120 is fed to the radiator 410. Moreover, the flow of the cooling water is decided with reference to the line Ls shown in FIG. 2.

In the above-described step S125, if it is determined that the inlet temperature is not equal to or above the warm-up end temperature (step S125: NO), the flow rate control portion 620 circulates the cooling water at a flow rate that is more than that during normal operation (step S130). "A flow rate that is more than that during normal operation" implies a flow rate that is more than the flow rate in the case when the calorific value of the fuel cell 100 is the same during normal operation. Specifically, the flow rate control portion 620 determines the calorific value of the fuel cell 100 by referencing the calorific value map on the basis of the outlet temperature acquired in step S205 described above and the amount of power generated by the fuel cell 100. Also, the flow to control portion 620 decides the flow rate of the cooling water by referencing the cooling water flow rate map on the basis of the determined calorific value and outlet temperature, and controls the circulation pump 440 so that the decided flow rate is reached. The cooling water map referenced at this time is the line L7 shown in FIG. 2 because the outlet temperature is above 0 degrees Celsius. The cooling water flow rate of this line L7 is more than the cooling water flow rate shown by line Ls at the same calorific value. Therefore, by controlling the circulation pump 440 so that the flow rate determined on the basis of line L7 is reached, the cooling water can be circulated at a flow rate that is more than that during normal operation. Because the cooling water is circulated at a flow that is more than that during normal operation, the exchange of heat between each unit cell 110 is promoted, and the occurrence of distribution of heat between each unit cell 110 is suppressed. As a result, the warm-up time is reduced.

The temperature comparison and judgment portion 610 repeatedly executes step S130 from the time of start of step S130 until the predetermined time period has elapsed, and if the predetermined time period has elapsed (step S135; YES), the temperature comparison and judgment portion 610 returns to the above-described step S105.

In the fuel cell system 10 according to the above-described present embodiment, if the temperature of the inlet p1 is below the lower-limit value of the temperature range in which generated water does not re-freeze, the flow rate of the cooling water is reduced below the flow rate during normal operation. Therefore, re-freezing of generated water in each unit cell 110 can be suppressed, and the drop in the calorific value due to cooling of the heat generation sites in each unit cell 110 by the cooling water can be suppressed. Moreover, if the temperature of the inlet p1 is equal to or above the lower-limit value of the temperature range in which generated water does not re-freeze, the flow rate of the cooling water is increased beyond the flow rate during normal operation. Therefore, the exchange of heat between each unit cell 110 can be promoted, and the occurrence of distribution of heat between each unit cell 110 can be suppressed. As a result, in the fuel cell system 10, the warm up time of the entire fuel cell 100 can be shortened, and the time required for the warm-up operation can also be reduced.

Moreover, in the fuel cell system 10, the inlet temperature is used for determining the timing of switching from the state in which the flow rate of the cooling water is less than that during the normal operation to the state in which the flow is more. That is, when the inlet temperature is equal to or above a predetermined temperature (0 degrees Celsius), the flow rate of the cooling water is switched from the state in which the flow rate is less than that during the normal operation to the state in which the flow rate is more. Because of the use of the inlet temperature in determining the timing of switching, the judgment can be performed accurately. The inlet temperature is the lowest temperature in the circulation flow path R1. Therefore, if this temperature is higher than the lower-limit value of the temperature range in which generated water does not freeze, the temperature of the cooling water is above the lower-limit value of the temperature range in which generated water does not freeze, at any position of the circulation flow path R1. As a result, even if the flow rate of the cooling water is switched to a state in which it is more than that during the normal operation, the possibility of re-freezing of generated water in each unit cell 110 is low.

Moreover, if the outlet temperature is 0 degrees Celsius or above, it is not assumed that the inlet temperature is 0 degrees Celsius or above until the circulation of the cooling medium having a volume of at least one cycle of the circulation flow path R1 is complete, and therefore, it can be accurately determined whether or not the inlet temperature is 0 degrees Celsius or above. In addition, because the temperature sensor 450 is arranged near the outlet p2, the temperature sensor need not be arranged near the inlet p1. Therefore, a larger free space can be secured near the inlet p1, which enables easy installation of the circulation pump 440, and at the same time, enables the use of a larger pump as the circulation pump 410.

B. Modifications

B1: Modification 1:

In the above-described embodiment, the cooling water flow is set to increase as a result of an increase in the calorific value in the cooling water flow rate map used in the case when the inlet temperature is identified to be below 0 degrees Celsius, that is, in the six lines L1 to L6 shown in FIG. 2. However, the present invention is not limited thereto. For example, in place of the six lines L1 to L6, a line in which the cooling water flow rate is zero regardless of the calorific value can be set. In such a configuration too, a cooling water flow rate that is less than the line Ls is set when the calorific value is the same. Moreover, the line Ls can be used in place of the six lines L1 to L6 as the cooling water flow rate map used when the inlet temperature is identified to be below 0 degrees Celsius. In such a configuration too, due to the use of the line L7 in the case when the inlet temperature is identified to be 0 degrees Celsius or above, the exchange of heat between each cell 110 is promoted, because of which the time required for the warm-up operation after the inlet temperature becomes 0 degrees Celsius or above can be reduced.

Moreover, in the cooling water flow rate map used when the inlet temperature is 0 degrees Celsius or above, that is, in the line L7 shown in FIG. 2, a fixed flow rate Fa was set regardless of the calorific value, however, instead the flow rate Fa, a flow rate having any fixed value can be set. Also, same as the six lines L1 to L6, the line L7 may be set such that the cooling water flow rate increases as a result of an increase in the calorific value. In such a configuration, a cooling water flow rate that is more than the cooling water flow rate of line Ls is set in line L7.

B2: Modification 2:

In the above-described embodiment, it is identified whether or not the inlet temperature is 0 degrees Celsius or above on the basis of the outlet temperature, but the present invention is not limited thereto. In place of the outlet p2, or in addition to the outlet p2, the temperature sensor may be arranged at the inlet p1, the temperature acquired by the temperature sensor may be handled as the inlet temperature, and it may be determined whether or not the inlet temperature is 0 degrees Celsius or above. In such a configuration, the inlet temperature comparison and judgment process can be simplified, which enables a reduction in the time required for the cooling water control process during warm-up.

B3: Modification 3:

In the above-described embodiment, the inlet temperature comparison and judgment process is executed as a step of the cooling water flow control process during warm-up, but the inlet temperature comparison and judgment process may be executed as a process that is independent of the cooling water flow control process during warm-up. In such a configuration, the inlet temperature comparison and judgment process may be repeatedly executed, and a process of acquiring the most recent processing results of the inlet temperature comparison and judgment process may be provided as the first process in the cooling water flow rate control process during warm-up.

B4: Modification 4:

In the above-described embodiment, 0 degrees Celsius was adopted as the lower-limit value of the temperature range in which the generated water in each cell 110 does not freeze, however, the temperature is not limited to 0 degrees Celsius, and any arbitrary temperature may be set. For example, an appropriate temperature may be set in accordance with the usage environment and the type of cooling medium, such as −5 degrees Celsius, −10 degrees Celsius, or +3 degrees Celsius, etc.

B5: Modification 5:

In the inlet temperature comparison and judgment process according to the above-described embodiment, when the outlet temperature is determined to be 0 degrees Celsius or above, and in addition, it is determined that the cooling water having a volume of at least one cycle of the circulating flow path R1 is circulated within the judgment period, the inlet temperature was assumed to be 0 degrees Celsius or above, but the present invention is not limited thereto. The inlet temperature may be assumed to be 0 degrees Celsius or above when the outlet temperature is determined to be 0 degrees Celsius or above, and when it is determined that cooling water having a volume of at least the external flow path is circulating. When cooling water having a volume of at least the external flow path is circulating, the water present at the outlet p2 at the time when the inlet temperature is determined to be 0 degrees Celsius or above reaches at least the inlet p1 after passing through the external flow path. This is because the temperature at the inlet p1 is possibly 0 degrees Celsius or above.

B6: Modification 6:

In the above-described embodiment, the fuel cell system 10 was used as a system for supplying the drive power mounted on a fuel cell vehicle, but the present invention is not limited thereto. For example, in place of a fuel cell vehicle, the fuel cell system 10 may be mounted on any other moving body that requires drive power, such as an electric car, and used. Moreover, the fuel cell system 10 may be used as a fixed source of power, for example, it may be installed indoor or outdoor in an office or home, and used. Moreover, the fuel cell 100 was a polymer electrolyte fuel cell, but it may be configured as different types of fuel cells, such as a phosphoric acid fuel cell, a molten carbonate type fuel cell, or a solid oxide fuel cell.

B7: Modification 7:

The configuration of the fuel cell system 10 according to the above-described embodiment is simply an example, and various changes are possible. For example, a configuration in which the second fuel gas discharge path 264 and the oxidizing gas discharge path 332 are not connected, and discharge the off-gas independently may be adopted. Moreover, the bypass flow path 423 may be omitted. In such a configuration, the fan of the radiator 410 may be stopped during the warm-up operation. Moreover, in such a configuration, the cooling water discharge path 422, the radiator 410, the cooling water supply path 421, and the circulation pump 440 correspond to the external flow path in the claims. Also, in the fuel cell system 10, the warm-up operation was executed when the outlet temperature was below 0 degrees Celsius, but warm-up may be performed when the temperature is below an arbitrary temperature which is 0 degrees Celsius or above. The cooling water flow was decided with reference to the cooling water map, but the cooling water flow may be decided through calculation using a relational expression indicating the relation between the calorific value of the fuel cell 100, the outlet temperature, and the cooling water flow. Furthermore, in the fuel cell system 10, the calorific value of the fuel cell 100 is determined with reference to the calorific value map, but it may be calculated using a predetermined relational expression. For example, the output voltage value of the fuel cell 100 (the voltage value at the time of operation) may be subtracted from the theoretical starting voltage of the overall fuel cell 100 (for example, 1.4 V×No. of unit cells), and the current value (the current value at the time of operation) may be multiplied with the calculated voltage.

B8: Modification 8:

In the above-described embodiment, a part of the configuration that was implemented through hardware may be implemented through software, or conversely, a part of the configuration that was implemented through software may be implemented through hardware. Moreover, if some or all functions of the present invention are implemented through software, the software (compute program) can be provided by storing in a recording medium that can be read on a computer. "A recording medium that can be read on a computer" is not limited to a portable recording medium such as a flexible disk and CD-ROM, but also includes internal storage units inside a computer, such as various RAMs and ROMs, and external storage units fixed in a computer, such as hard disks. That is, "A recording medium that can be read on a computer" has a wide meaning, which includes any recording medium in which data can be fixed rather than being stored temporarily.

The present invention is not restricted to the above-described embodiments and modifications, and may be implemented by a diversity of other configurations without departing from the scope of the invention. For example, the technical characteristics described in the embodiments and modifications corresponding to the technical characteristics in each form described in the SUMMARY may be appropriately substituted or combined together in order to resolve some or all of the above-described issues, or to realize some or all of the above-described effects. Moreover, if the technical characteristics are not described as compulsory in the SPECIFICATION, they may be deleted appropriately.

What is claimed is:

1. A fuel cell system, comprising:
    a fuel cell;
    an internal flow path of a cooling medium formed inside the fuel cell;
    an external flow path formed outside the fuel cell that forms a circulation flow path of the cooling medium by being connected to the internal flow path; and
    a control device programmed to:
        acquire a temperature of the fuel cell and identify a calorific value of the fuel cell,
        during a time period when the temperature of the fuel cell is lower than an end temperature that is predetermined as a temperature at the time of end of a warm-up operation, determine whether or not an inlet temperature, which is the temperature of the cooling medium at an inlet to the internal flow path within the circulation flow path, is equal to or above a lower-limit temperature of a temperature range in which generated water does not freeze within the fuel cell,
        when it is determined that the inlet temperature is equal to or above the lower-limit temperature during the time period, execute a first adjustment of a flow rate of the cooling medium in the circulation flow path so as to become greater than a normal flow rate corresponding to the calorific value of the fuel cell,
        when it is determined that the inlet temperature is not equal to or above the lower-limit temperature during the time period, execute a second adjustment of the flow rate of the cooling medium in the circulation flow path to be a flow rate that is less than the normal flow rate and that increases in accordance with an increase in the calorific value of the fuel cell, and
        adjust the flow rate of the cooling medium in the circulation flow path to be equal to the normal flow rate when the temperature of the fuel cell becomes equal to or above the end temperature, wherein the normal flow rate is a flow rate of the cooling medium determined based on the calorific value of the fuel cell.

2. The fuel cell system according to claim 1, wherein the control device is programmed to
    adjust the flow rate of the cooling medium in the circulation flow path to become less than the normal flow rate when it is determined that the inlet temperature is not equal to or above the lower-limit temperature.

3. The fuel cell system according to claim 1, wherein the control device is programmed to:
    execute the judgment of whether or not the inlet temperature is equal to or above the lower-limit temperature during the time period and terminate the judgment when the temperature of the fuel cell becomes equal to or above the end temperature, wherein the time period is included in a time period when the warm-up operation is executed on start of the fuel cell system at a below-zero degrees Celsius temperature, and
    execute the first adjustment and the second adjustment when the temperature of the fuel cell during the time period when the warm-up operation is executed with the fuel cell system being started at the below-zero degrees Celsius temperature is lower than the end temperature, and terminate the first adjustment and the second adjustment when the temperature of the fuel cell becomes equal to or above the end temperature.

4. The fuel cell system according to claim 1, wherein the control device is programmed to:
    acquire an outlet temperature that is the temperature of the cooling medium at an outlet of the internal flow path within the circulation flow path,
    determine whether or not the outlet temperature is equal to or above the lower-limit temperature,
    determine whether or not the cooling medium having a predetermined volume corresponding to a volume of at least an external flow path of the circulation flow path passes through the inlet during the time period that has elapsed since the previous judgment until the current judgment of the fact that the outlet temperature is equal to or above the lower-limit temperature, when it is determined that the outlet temperature is equal to or above the lower-limit temperature,
    determine that the inlet temperature is equal to or above the lower-limit temperature when it is determined that the cooling medium having the predetermined volume passes through the inlet during the elapsed time period, and
    determine that the inlet temperature is not equal to or above the lower-limit temperature when it is determined that the outlet temperature is not above the lower-limit temperature, or the cooling medium having the predetermined volume does not pass through the inlet during the elapsed time period.

* * * * *